A. Oot,
Fruit Knife.
Nº 21,695.     Patented Oct. 5, 1858.
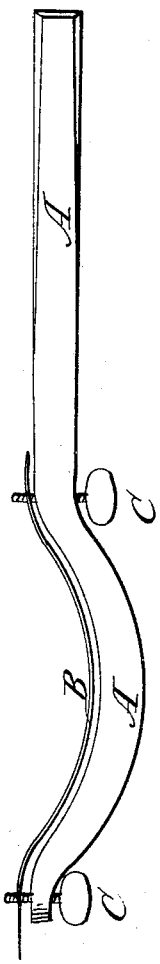

UNITED STATES PATENT OFFICE.

ADAM OOT, OF MINETTO, NEW YORK.

APPLE-PARING KNIFE.

Specification of Letters Patent No. 21,695, dated October 5, 1858.

*To all whom it may concern:*

Be it known that I, ADAM OOT, of Minetto, in the county of Oswego and State of New York, have invented an Improved Paring-Knife Applicable to the Paring of Fruits and Vegetables; and I do hereby declare the following to be a correct description of the same, reference being had to the accompanying drawing, which represents a top or back view of the knife.

The nature of my invention consists in attaching to a curved stock or handle, by means of adjusting screws, a curved blade for the purpose of forming a convenient fruit paring knife for hand use.

In the drawing A marks the stock or handle; B, the blade; C, C, the adjusting screws for regulating the distance between the stock and blade.

The blade B is curved as shown, and its point projects a short distance beyond the end of the stock for the purpose of affording the means of cutting out stems, blossoms, and defective portions of fruit after the paring is effected. The blade should be adjusted at such a distance from the stock as to remove the skin of the fruit only to the required depth.

The knife is held and used in the same manner as an ordinary case knife, but its curved form enables it to remove large portions of skin at once, and the proximity of the blade and stock prevents the former from removing any more of the fruit than is desirable.

Having thus described my invention, what I claim is—

The combination and arrangement of the curved blade, with its projecting end, and the guard or stock substantially as and for the purpose specified.

The above specification signed and witnessed this fifteenth day of September A. D. 1858.

ADAM OOT.

Witnesses:
EDM. F. BROWN,
CHAS. F. STANSBURY.